Aug. 6, 1957 J. ZAWELS 2,802,067

SYMMETRICAL DIRECT CURRENT STABILIZATION IN SEMICONDUCTOR AMPLIFIERS

Filed Sept. 30, 1953

INVENTOR.
Jakob Zawels

BY H. O. Newton
ATTORNEY

United States Patent Office 2,802,067

Patented Aug. 6, 1957

2,802,067

SYMMETRICAL DIRECT CURRENT STABILIZATION IN SEMICONDUCTOR AMPLIFIERS

Jakob Zawels, Capetown, Union of South Africa, assignor to Radio Corporation of America, a corporation of Delaware Application September 30, 1953, Serial No. 383,233

16 Claims. (Cl. 179—171)

Figure 1:
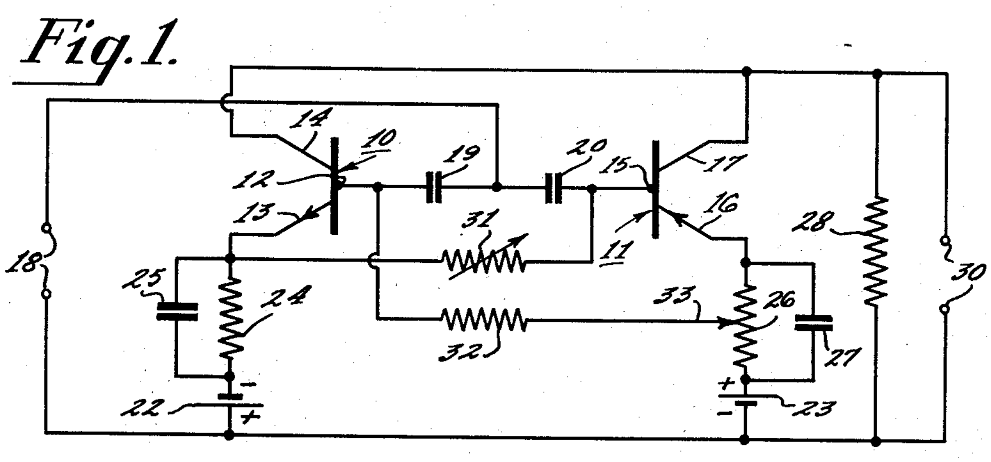

The present invention relates generally to signal translating or amplifying circuits utilizing semi-conductor devices of opposite conductivity type, and particularly to signal amplifiers utilizing semi-conductor devices of this type in a balanced symmetrical circuit arrangement.

When utilizing circuits employing semi-conductor devices such as transistors, it is desirable to be able to replace any of the transistors without having to readjust the circuits for satisfactory operation. It is known, however, that both the dynamic and static characteristics of transistors vary appreciably from one unit to another although the units are constructed to be identical with each other. Accordingly, a circuit which has been adjusted to operate satisfactorily with one pair of transistors may be found to be less satisfactory or even unsatisfactory with a second pair of transistors due to the difference in the transistor characteristics.

Further it is desirable from the aspect of convenience, economy and bulk to operate circuits employing semi-conductor devices from a single source of direct current voltage. Since the various electrodes of the transistors must be maintained at different voltage levels some means for producing or selecting the required voltage levels must be provided when operating such circuits from a single source of direct current voltage.

One such bias means for a transistor circuit is disclosed in U. S. Patent 2,517,960 granted to H. L. Barney et al., August 8, 1950, for "Self Biased Solid Amplifier." The patentee describes a self biasing arrangement wherein it is possible to bias the base electrode with respect to the other electrodes. However, it has been found that known self-biasing circuits do not adapt themselves adequately to transistors of varying operating characteristics or for varying operating conditions.

Also, it is well known to those skilled in the semi-conductor art that the collector saturation current of a semi-conductor device varies considerably with temperature variation. The collector saturation current of a semi-conductor device is defined as the current flowing in the collector electrode when the emitter electrode current is zero. It is readily seen, therefore, that if a circuit has been adjusted for satisfactory operation under a predetermined temperature condition and in operation a temperature change is encountered, the resultant collector saturation current variation will alter the bias voltages appearing at the various electrodes and accordingly may result in an unsatisfactory or even inoperative circuit under the changed temperature conditions.

Accordingly it is an object of the present invention to provide a stable and efficient semi-conductor signal translating circuit and more particularly to provide such a circuit which is suitable for use as an amplifier.

It is a further object of the present invention to provide an improved semi-conductor signal amplifier circuit utilizing a pair of semi-conductor devices of opposite conductivity type which enables ready and satisfactory operation with other pairs of semi-conductor devices having different operating characteristics.

It is a still further object of the present invention to provide an improved semi-conductor signal amplifier circuit utilizing semi-conductor devices of opposite conductivity type in a direct-current symmetrical arrangement wherein differences in the semi-conductor devices involving a change of collector current saturation will react to affect stabilization of operation of the devices.

It is another object of this invention to provide a direct current stabilized signal amplifier circuit utilizing a pair of semi-conductor devices of opposite conductivity type in a direct current symmetrical circuit arrangement which enables utilization therein of other pairs of semi-conductor devices having dissimilar charactreistics and which provides for stabilization of the operating point with a variation in collector current saturation.

In accordance with one aspect of the present invention a pair of semi-conductor devices of opposite conductivity type are provided in a signal amplifier circuit which is symmetrically arranged for both direct current and alternating current. An input signal is applied in phase relation between the respective input electrodes of the pair of semi-conductor devices and an output circuit is provided in common between the output electrodes of the pair of semi-conductor devices and a point of fixed reference potential. The operating point of the semi-conductor devices is stabilized by cross-connecting the respective dissimilar input electrodes of the semi-conductor devices.

In accordance with a further aspect of the present invention a pair of semi-conductor devices of opposite conductivity type are provided in a signal amplifier circuit which is arranged symmetrically for direct current and which is asymmetrical for alternating current. Accordingly an input signal is applied between the input electrodes of the first of the pair of semi-conductor devices, and an output circuit is connected to the output electrodes of the second of the pair of semi-conductor devices. Stabilization of the operating point of the semi-conductor devices is accomplished due to the direct current symmetry of the circuit by cross-connecting the respective dissimilar input electrodes.

Figure 2:
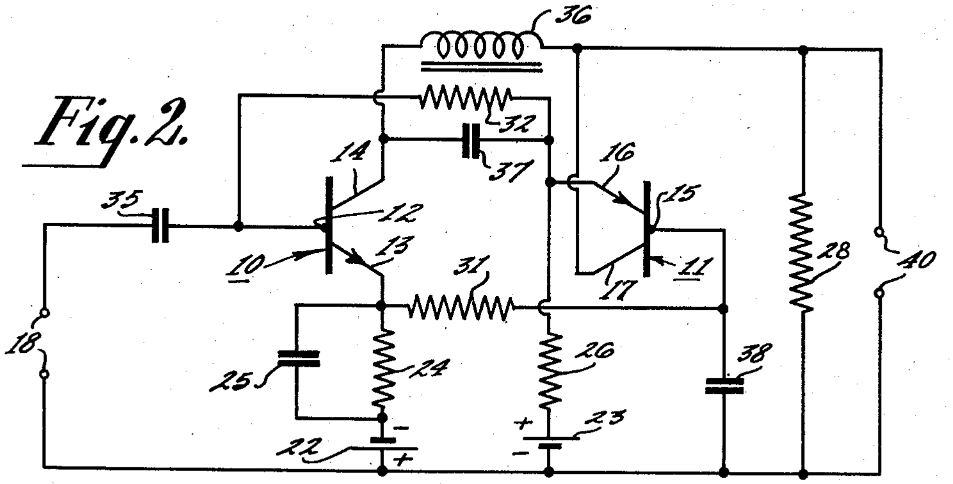
Figure 3:
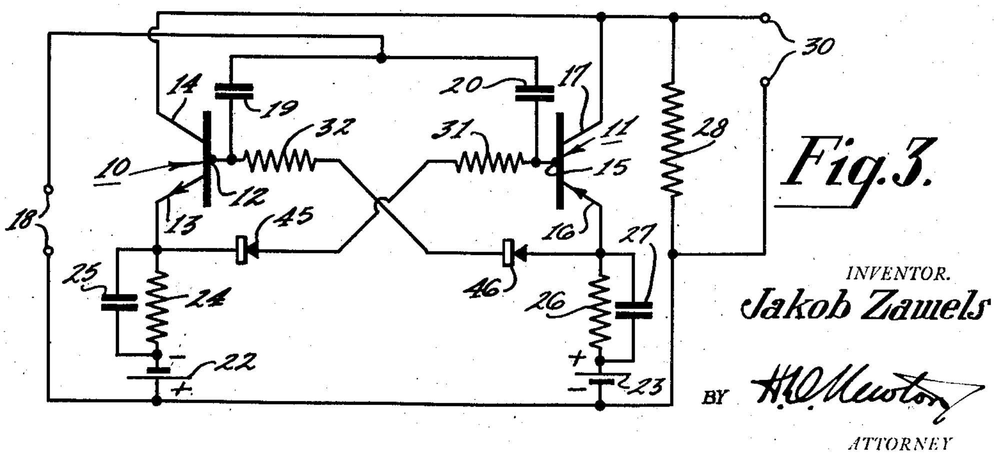

The novel features that are considered characteristic of this invention are set forth with particularity in the appended claims. The invention itself, however, both as to its organization and method of operation as well as additional objects and advantages thereof will best be understood from the following description when read in connection with the accompanying drawing in which:

Figure 1 is a schematic circuit diagram of a symmetrical, push-pull semi-conductor amplifier circuit illustrating one embodiment of the present invention;

Figure 2 is a schematic circuit diagram of two cascaded semi-conductor amplifier circuits utilizing semi-conductor devices of opposite conductivity type and illustrating a further embodiment of the present invention; and Figure 3 is a schematic circuit diagram of a pair of semi-conductor devices arranged in a push-pull symmetrical circuit illustrating a still further embodiment of the present invention.

Referring now to the drawing wherein like reference characters are used throughout the various figures to designate like elements and particularly to the amplifier circuits shown in Figure 1, a pair of semi-conductor devices of opposite conductivity type such as transistors 10 and 11 are provided in a symmetrical signal amplifier circuit. These transistors 10 and 11 are of the junction type, for example. The transistor 10 is of the N–P–N variety and includes a base electrode 12 and emitter electrode 13 and a collector electrode 14. The transistor 11 is of the P–N–P variety and includes a base electrode 15 and emitter electrode 16 and a collector electrode 17.

An input circuit for applying an input signal of the same instantaneous polarity between the input electrodes of the semi-conductor devices 10 and 11 includes a pair of input terminals 18, one of which is coupled in common to the base electrodes 12 and 15 through a pair of coupling capacitors 19 and 20. The other of the pair of input terminals may be connected to a point of fixed reference potential such as ground.

A source of direct current bias is provided, which may comprise a single center tapped source, but is illustrated as a pair of batteries 22 and 23 having their respective positive and negative terminals connected to ground. The negative terminal of the battery 22 is connected to the emitter electrode 13 through an emitter resistor 24 which may be bypassed at signal frequencies by a capacitor 25. The positive terminal of the battery 23 is connected to the emitter electrode 16 through an emitter resistor 26 which may also be bypassed at signal frequencies by a capacitor 27.

An output circuit includes a load impedance illustrated as a resistor 28 connected in common between the collector electrodes 14 and 17 and ground, and further includes a pair of output terminals 30 which are connected to the respective ends of the load resistor 28.

Direct current stabilization is obtained, in accordance with the present invention, by a pair of cross-coupled stabilizing impedance elements illustrated as a pair of resistors 31 and 32. The stabilizing resistor 31, which may be variable as illustrated, is connected between the emitter electrode 13 and the base electrode 15 and the stabilizing resistor 32 is similarly connected between the base electrode 12 and an adjustable tap 33 on the emitter resistor 26.

In discussing the operation of the signal amplifier circuit illustrated in Figure 1, let it be assumed that the circuit is initially operating with proper bias conditions and further that the temperature of the transistors 10 and 11 is increasing due to a rise in ambient temperature. In accordance with the above discussion, it is readily seen that the collector saturation current in each of the two transistors 10 and 11 will increase. This increased current will flow through the emitter electrode resistors 24 and 26.

An increased current through the emitter electrode resistor 24 will cause the emitter electrode 13 to become more positive with respect to ground. Since the emitter electrode 13 is coupled to the base electrode 15 by means of a direct current stabilizing resistor 31, an increase in the positive direction of the voltage appearing at the emitter electrode 13 will adjust the bias current flowing out of the base electrode 15 in the direction of cut-off. That is, there is a reduction in the base current flowing out of the base electrode 15.

It is readily evident that a like effect is obtained due to an increase in the collector saturation current of the transistor 11. This will cause an increase in the current flowing to the emitter electrode resistor 26, which in turn will cause the voltage at the emitter electrode 16 to become more negative with respect to ground. This voltage change is in the direction to adjust the bias current flowing into the base electrode 12 to cut off the transistor 10 or reduce the current flowing therethrough. It is also readily apparent that the effective direct current stabilization is cumulative. That is, the effect of an increase in the collector saturation current of one of the devices provides a corrective voltage which is effective to vary the operating point of each of the two transistors 10 and 11 to provide a tendency towards a reduction of current in both.

Similarly, upon the substitution of a second pair of transistors having possibly a higher gain, the direct current conditions of the circuit would tend to change. This would produce a corrective voltage, as above described, which would minimize the change of the direct current conditions.

It is noted that the direct current stabilizing resistor 31 may be variable to effectively adjust, by means of a single control, the operating points of both of the transistors. Accordingly a decrease in the resistance of the direct current stabilizing impedance 31 will result in an increase in the collector current of the transistor 11 and a decrease in the collector current of the transistor 10. Thus by means of this single control a balancing of both transistors can be achieved.

It may also be readily seen that the single control provided by the variable tap 33 on the emitter electrode resistor 26 will provide the same type of balancing action. It is further noted that this method of direct current stabilization requires no additional components over other existing methods of direct current stabilization, and since the bias for the base electrodes is obtained from the emitter electrode resistors rather than from the collector electrode circuit as is customary, there is less alternating current degeneration.

Figure 2 is a schematic circuit diagram of a pair of opposite conductivity type junction transistors arranged in an amplifier circuit which is cascade coupled for alternating currents and balanced for direct currents and in which the input stage is of the A.-C. grounded emitter type, while the output stage is of the A.-C. grounded base type. Accordingly, the same type of balanced direct-current stabilization may be readily obtained as discussed in connection with Figure 1 above.

However, since this circuit provides singled-ended cascade-coupled amplification for the input signal energy, a pair of input terminals 18 is provided, one of which is coupled to the base electrode 12 through a coupling capacitor 35, the other of which is grounded. The output current of transistor 10, which is an amplified version of the input signal wave, is coupled to the emitter electrode 16 by a coupling capacitor 37.

In order to complete the input circuit of the transistor 11, the base electrode 15 is connected to ground for signal frequencies by a capacitor 38.

The output circuit for the transistor 11 includes a collector electrode impedance element illustrated as a resistor 28 connected between a pair of output terminals 40, one of which is electrode 17, the other of which may be ground.

The choke coil 36 provides alternating current isolation between the two stages at signal frequencies while at the same time providing a direct current path for the collector current.

It may be readily seen from a direct current point of view, this cascade-coupled amplifier system provides a balanced direct current arrangement wherein variation in the collector saturation current of one or both of the transistors 10 and 11 will provide a balancing action as discussed above in connection with Figure 1 to adjust the operating point or points of one or both of the transistors to stabilize the circuits against changes in the operating characteristics of the transistors utilized. Similarly, should the circuit be left unchanged except for the replacement of two transistors of similar alpha by two others having a higher or lower alpha, then the circuit reacts in a manner which will tend to minimize the emitting change in the operating conditions.

Accordingly it is seen that if the collector current of the transistor 10 increases, whether due to a higher saturation current or the use of a higher alpha transistor, there will be an increase in the current flow in the emitter electrode resistor 24 resulting in an increase in the voltage of the emitter electrode 13 in a positive direction. This increase of the voltage at the emitter electrode 13, as above discussed, will tend to reduce the current flowing in the transistor 11. Also the same type of action will occur if the collector current of the transistor 11 increases. This will result in an increase in the current flow through the emitter electrode resistor 26, thereby increasing the voltage in a negative direction at the emitter electrode 16 resulting in a change in the bias of the base electrode 12 thereby providing a balancing action.

Figure 3 illustrates the utilization of non-linear impedance elements in the balanced direct current stabilizing circuit to enhance the stabilizing action. Accordingly the cross-coupled direct current stabilizing circuit includes a pair of diodes 45 and 46. The first diode is coupled in series between the direct-current stabilizing element 31 and the emitter electrode 13 and poled in such a direction so as to enhance the stabilizing action provided by the voltage appearing at the emitter electrode 13. The second diode 46 is connected in series between the direct-current stabilizing element 32 and the emitter electrode 16 and also poled in such a direction as to enhance the stabilizing action provided by the varying voltage appearing at the emitter electrode 16.

It may also readily be seen that devices which have a varying impedance characteristic with temperature may be utilized to enhance temperature stabilization, that is, resistive elements having a positive resistance characteristic may be utilized in place of the diode elements 45 and 46.

When diode elements are utilized as a part of the balanced stabilization circuit as illustrated in Figure 3, it is apparent that an increase in the collector current of the transistor 10 will produce at the emitter electrode 13 an increase in voltage in the positive direction with respect to ground. It is well known to those skilled in the semi-conductor art that a decrease in bias in the forward direction across a diode element will provide an increased impedance of the diode element. It is readily apparent that the above discussed change in voltage appearing at the emitter electrode 13 produces a decrease in the forward bias appearing across the diode 45. Accordingly, the impedance of the diode 45 will be increased and the change in bias current in the base electrode of transistor 11 will be increased. The same type of action will appear in the base electrode circuit of the transistor 10. Hence, the stabilizing action of the voltage change at the emitter electrodes 13 and 16 is enhanced.

A resistive element having a positive resistance characteristic, that is, a characteristic whereby the impedance of the device increases with temperature will result in an enhancement of the corrective action of the direct-current stabilizing circuit by virtue of the fact that as the temperature increases, the collector saturation current of the semi-conductor devices tends to increase and if the impedance of the cross-coupled direct-current stabilization circuit increases, the resulting decrease in base bias current due to the increased voltage drop across the emitter resistors produced by the temperature change, will be enhanced to produce the desired corrective action.

Thus, it is seen that by providing a pair of semi-conductor devices of opposite conductivity type in a balanced direct-current arrangement which may include either balanced push-pull alternating current operation or single-ended cascade-coupled alternating current operation and which further includes a direct current stabilization circuit by cross-coupling the respective dissimilar input electrodes of the semi-conductor devices, direct-current stabilization of the operating point of the amplifier circuit is obtained with a minimum of circuit elements. Accordingly, the operating point of the signal amplifier circuit may be balanced by means of a single control and stabilization is obtained for variation in the operating characteristics of a pair of semi-conductor devices due to an inherent difference in the operating characteristics thereof or due to a change in the operating conditions under which the transistors are being utilized.

What is claimed is:

1. A signal amplifier circuit, comprising in combination, a first and a second semi-conductor device of opposite conductivity types each including input, output and common electrodes, means providing a symmetrical direct current circuit in connection with said pair of semi-conductor devices whereby said devices are traversed by a common direct current, means for impressing an input signal upon at least one of said input electrodes, signal output means coupled to at least one of said output electrodes, and direct current conductive stabilizing means cross-coupled between like pairs of dissimilar electrodes of said first and second semi-conductor devices to provide stable operation of said circuit with varying temperature.

2. In a signal amplifier circuit, the combination as defined in claim 1 wherein said direct current conductive stabilizing means comprises a first resistive element and a second resistive element and each of said semi-conductor devices includes a base, an emitter, and a collector electrode, said first resistive element being connected between the emitter electrode of said first semi-conductor device and the base electrode of said second semi-conductor device, and said second resistive element being connected between the base electrode of said first semi-conductor device and the emitter electrode of said second semi-conductor device.

3. In a signal amplifier circuit, the combination as defined in claim 2 wherein said first resistive element is variable whereby said amplifier circuit is balanced by a single control means.

4. In a signal amplifier circuit, the combination as defined in claim 3 wherein said symmetrical direct current circuit includes an emitter resistor connected to said second emitter electrode, said emitter resistor including a tap thereon, and wherein said second resistive element is connected between the base electrode of said first semi-conductor device and said tap.

5. The combination comprising a pair of semi-conductor devices of opposite conductivity type each having input, output and common electrodes; means for applying a signal voltage between the input electrode and common electrode of one of said pair of semi-conductor devices; an output load device coupled between the common electrode and the output electrode of the other of said pair of semi-conductor devices; means including said semi-conductor devices for causing a common direct current to flow through said semi-conductor devices; and direct current stabilizing means cross-coupled between like pairs of dissimilar electrodes of said semi-conductor devices.

6. In a signal amplifier circuit, the combination as defined in claim 5 wherein said direct current stabilizing means comprises a first and a second resistive element having a positive temperature coefficient and each of said semi-conductor devices includes a base, an emitter, and a collector electrode, said first resistive element being connected between the emitter electrode of said first semi-conductor device and the base electrode of said second semi-conductor device, said second resistive element being connected between the base electrode of said first semi-conductor device and the emitter electrode of said second semi-conductor device.

7. In a signal amplifier circuit, the combination as defined in claim 5 wherein said direct current stabilizing means comprises a first and a second unilateral conducting device and each of said semi-conductor devices includes a base, an emitter, and a collector electrode, said first unilateral conducting device being connected between the emitter electrode of said first semi-conductor device and the base electrode of said second semi-conductor device, said second unilateral conducting device being connected between the base electrode of said first semi-conductor device and the emitter electrode of said second semi-conductor device.

8. In a signal amplifier circuit, the combination as defined in claim 5 wherein said direct current stabilizing means comprises a first and a second non-linear element and each of said semi-conductor devices includes a base, an emitter, and a collector electrode, said first non-linear element being connected between the emitter electrode of said first semi-conductor device and the base electrode of said second semi-conductor device, said second non-linear element being connected between the base electrode of said first semi-conductor device and the emitter electrode of said second semi-conductor device.

9. The combination comprising: a pair of semi-conductor devices of opposite conductivity type each having input, output and common electrodes; means for applying equal signal voltages to said input electrodes in like phase with respect to said common electrodes; an output load device coupled between said common electrodes and said output electrodes; means including said semi-conductor devices for causing output currents to flow through one of said semi-conductor devices and said load device in one direction and through the other of said devices and said load device in the opposite direction in response to said signal voltages; and direct current conductive stabilizing means cross coupled between said common and input electrodes of said semi-conductor devices.

10. In a signal amplifier circuit, the combination comprising a first and a second semi-conductor device of opposite conductivity types each including input, output and common electrodes, means providing a symmetrical direct current circuit in connection with said semi-conductor devices wherein the common electrode-output electrode path of said semi-conductor devices is in series and adapted to be traversed by a common direct current, means for impressing an input signal of the same instantaneous polarity between said input electrodes and said common electrodes, a load impedance element connected between said output electrodes and said common electrodes, and direct current conductive stabilizing means cross-coupled between said common and input electrodes of said first and said second semi-conductor device to provide stabilized operation with varying temperature.

11. A semi-conductor signal amplifier circuit, comprising in combination, a first and a second semi-conductor device of opposite conductivity types each including a base electrode, an emitter electrode and a collector electrode, input means coupled between said base electrodes and said emitter electrodes for simultaneously applying input energy of the same polarity between each of said base electrodes and its associated emitter electrodes, means connecting said collector electrodes to a common output load, a first direct current conductive stabilizing resistor connected between the emitter electrode of said first semi-conductor device and the base electrode of said second semi-conductor device, and a second direct current conductive stabilizing resistor connected between the emitter electrode of said second semi-conductor device and the base electrode of said first semi-conductor device, whereby the direct current operating point of said signal amplifier circuit is stabilized against varying characteristics of said semi-conductor devices.

12. In a signal amplifier circuit, the combination of a pair of semi-conductor devices of opposite conductivity type each having base, collector and emitter electrodes; means connecting the emitter-collector path of said pair of semi-conductor devices in series for direct current; an output load impedance element coupled between said emitter electrodes and said collector electrodes; means including said pair of semi-conductor devices for causing output signal currents to flow through one of said devices and said load device in one direction and through the other of said devices and said load device in the opposite direction in response to signal voltages; a first variably resistive element connected between the emitter electrode of one of said pair of semi-conductor devices and the base electrode of the other of said pair of semi-conductor devices; and a second variable resistive element connected between the emitter electrode of said one of said pair of semi-conductor devices and the base electrode of said other of said pair of semi-conductor devices.

13. A semi-conductor signal amplifier circuit, comprising in combination, a first and a second semi-conductor device of opposite conductivity types each including a semi-conductive body and a plurality of electrodes in contact therewith, said plurality of electrodes including a base electrode, an emitter electrode and a collector electrode, input means coupled between said base electrodes and said emitter electrodes for simultaneously applying input energy of the same polarity between each of said base electrodes and its associated emitter electrode, means connecting said collector electrodes to a common output load, a first direct current conductive stabilizing impedance element coupled between the emitter electrode of said first semi-conductor device and the base electrode of said second semi-conductor device, and a second direct current conductive stabilizing impedance element coupled between the emitter electrode and said second semi-conductor device and the base electrode of said first semi-conductor device, whereby the direct current operating point of said signal amplifier circuit is stabilized against varying characteristics of said semi-conductor devices.

14. A semi-conductor signal amplifier circuit, comprising in combination, a first and a second semi-conductor device of opposite conductivity types each including a base electrode, an emitter electrode and a collector electrode, input means coupled to at least one of said base electrodes, means connecting the emitter electrode-collector electrode path of said pair of semi-conductor devices in series to provide a common direct current conductive path, means connecting at least one of said collector electrodes to an output load element, a first direct current conductive stabilizing impedance element connected between the emitter electrode of said first semi-conductor device and the base electrode of said second semi-conductor device and a second direct current conductive stabilizing impedance element coupled between the emitter electrode and said second semi-conductor device and the base electrode of said first semi-conductor device, whereby the direct current operating point of said signal amplifier circuit is stabilized against varying characteristics of said semi-conductor devices.

15. A semi-conductor signal amplifier circuit, comprising in combination: a first semi-conductor device of one conductivity type including a first semi-conductive body, a first base electrode, a first collector electrode, and a first emitter electrode in contact with said first semi-conductive body; a second semi-conductor device of an opposite conductivity type including a second semi-conductive body, a second base electrode, a second collector electrode, and a second emitter electrode each in contact with said second semi-conductive body; energizing means coupled to each of said electrodes for applying a reverse bias between each of said collector and emitter electrodes, input means for simultaneously applying input signal energy of the same instantaneous polarity between each of said base electrodes and their respective emitter electrodes; an output circuit including a pair of output terminals and a common conductive circuit between each of said collector electrodes and one terminal of said pair of output terminals; a direct current stabilizing circuit including a pair of direct current conductive impedance elements cross-coupled between the emitter and base electrodes of said first and said second semi-conductor devices whereby the operating points of said signal amplifier circuit is stabilized against variations in the operating characteristics of said semi-conductor devices.

16. A semi-conductor signal amplifier circuit, comprising in combination: a first semi-conductor device of one conductivity type including a first semi-conductive body of the N–P–N variety, a first base electrode, a first emitter electrode and a first collector electrode, each of said electrodes being in contact with said first conductive body; a second semi-conductor device including a second semi-conductive body of the P–N–P variety, a second base electrode, a second emitter electrode and a second collector electrode, each of said electrodes being in contact with said second semi-conductive body; energizing means coupled to each of said electrodes for applying a bias between the respective base and emitter electrodes and a reverse bias between the respective base and collector electrodes; input means for simultaneously applying input signal energy between said base electrodes and said emitter electrodes; an output impedance element having a pair of terminals; a common conductive circuit between said first collector electrode, said second collector electrode and one of said output impedance terminals whereby amplification of the input signal energy is accomplished and only the alternating current component of the output current flows to said output impedance; a first conductive direct current stabilizing impedance element connected between the emitter electrode of said first semiconductor device and the base electrode of said second semi-conductor device; and a second direct current conductive stabilizing impedance element connected between the emitter electrode of said second semi-conductor device and the first electrode of said first semi-conductor device whereby the operating point of said signal amplifier circuit is stabilized against the varying characteristics of said semi-conductor devices.

References Cited in the file of this patent

UNITED STATES PATENTS

| | | |
|---|---|---|
| 2,666,817 | Raisbeck et al. | Jan. 19, 1954 |
| 2,666,818 | Shockley | Jan. 19, 1954 |
| 2,666,819 | Raisbeck | Jan. 19, 1954 |